United States Patent

[11] 3,571,597

[72] Inventors Lockett E. Wood; Moody C. Thompson, Jr, Boulder; William B. Grant, Longmont; Dean Smith, Boulder, Colo.

[21] Appl. No. 866,181

[22] Filed Oct. 14, 1969

[45] Patented Mar. 23, 1971

[73] Assignee The United States of America as represented by the Secretary of Commerce

[54] SYSTEM FOR PHASE STABILIZING WIDELY SEPARATED OSCILLATORS

5 Claims, 2 Drawing Figs.

[52] U.S. Cl. .......... 250/199, 325/58, 325/63, 325/346, 325/419, 343/7.5

[51] Int. Cl. .......... H04b 9/00, H04b 1/00

[50] Field of Search .......... 250/94.5, 199; 325/4, 5, 12, 17, 58, 63, 346, 419; 331/172; 343/7.5, 100 (SAT)

[56] References Cited

UNITED STATES PATENTS

| | | | |
|---|---|---|---|
| 3,419,814 | 12/1968 | Graves .......... | 325/58 |
| 3,437,820 | 4/1969 | Thompson et al. .......... | 250/199 |

*Primary Examiner*—Robert L. Griffin
*Assistant Examiner*—Albert J. Mayer
*Attorney*—David Robbins ABSTRACT: A primary station and a remote secondary station generate a primary signal and an auxiliary signal, respectively, at slightly different frequencies. The primary signal is transmitted to the secondary station and mixed with the auxiliary signal, to give a first IF signal. The auxiliary signal is transmitted to the primary station and mixed with the primary signal to obtain a second IF signal, which is returned to the secondary station via an auxiliary FM link. The two IF signals are then mixed to give a signal at twice the IF frequency. A locally generated reference signal of frequency equal to the IF frequency is doubled and compared with the signal from the last mixer, to give an error signal that is applied to the voltage-tuned auxiliary signal oscillator. This established a closed feedback loop that maintains the phase of the auxiliary signal equal to the phase of the primary signal and the phase delay of the path between the stations. A secondary oscillator at the frequency of the primary signal is then phase locked to the auxiliary signal to provide a signal that is coherent with the primary signal. The primary and auxiliary signals may be transmitted as modulations on light beams directed over the path between the stations.

INVENTORS
Lockett E. Wood
Moody C. Thompson, Jr.
William B. Grant
Dean Smith
BY Alvin J. Englert AGENT INVENTORS
Lockett E. Wood
Moody C. Thompson, Jr.
William B. Grant
Dean Smith
BY Alvin J. Englert AGENT

SYSTEM FOR PHASE STABILIZING WIDELY SEPARATED OSCILLATORS

BACKGROUND OF THE INVENTION

There are many radio systems in which it is necessary to synchronize one or more remote secondary oscillators to a primary oscillator. Examples of such systems are long baseline radio interferometers, missile and satellite tracking systems, and systems for distributing precise standard frequency signals over intercontinental distances. In these systems, if the primary signal is propagated through the atmosphere to the distant stations, the received signals are modulated by the random fluctuations in the phase velocity of the atmosphere, causing large errors in the phase synchronization of the secondary oscillators.

SUMMARY OF THE INVENTION

The present invention greatly reduces the propagation-induced phase fluctuations in the primary signal received at the secondary stations. Briefly, this is done by measuring the phase delay in the signal and providing a feedback loop that stabilizes the delay to a nearly constant value.

DESCRIPTION OF THE PREFERRED EMBODIMENTS

Figure 1:
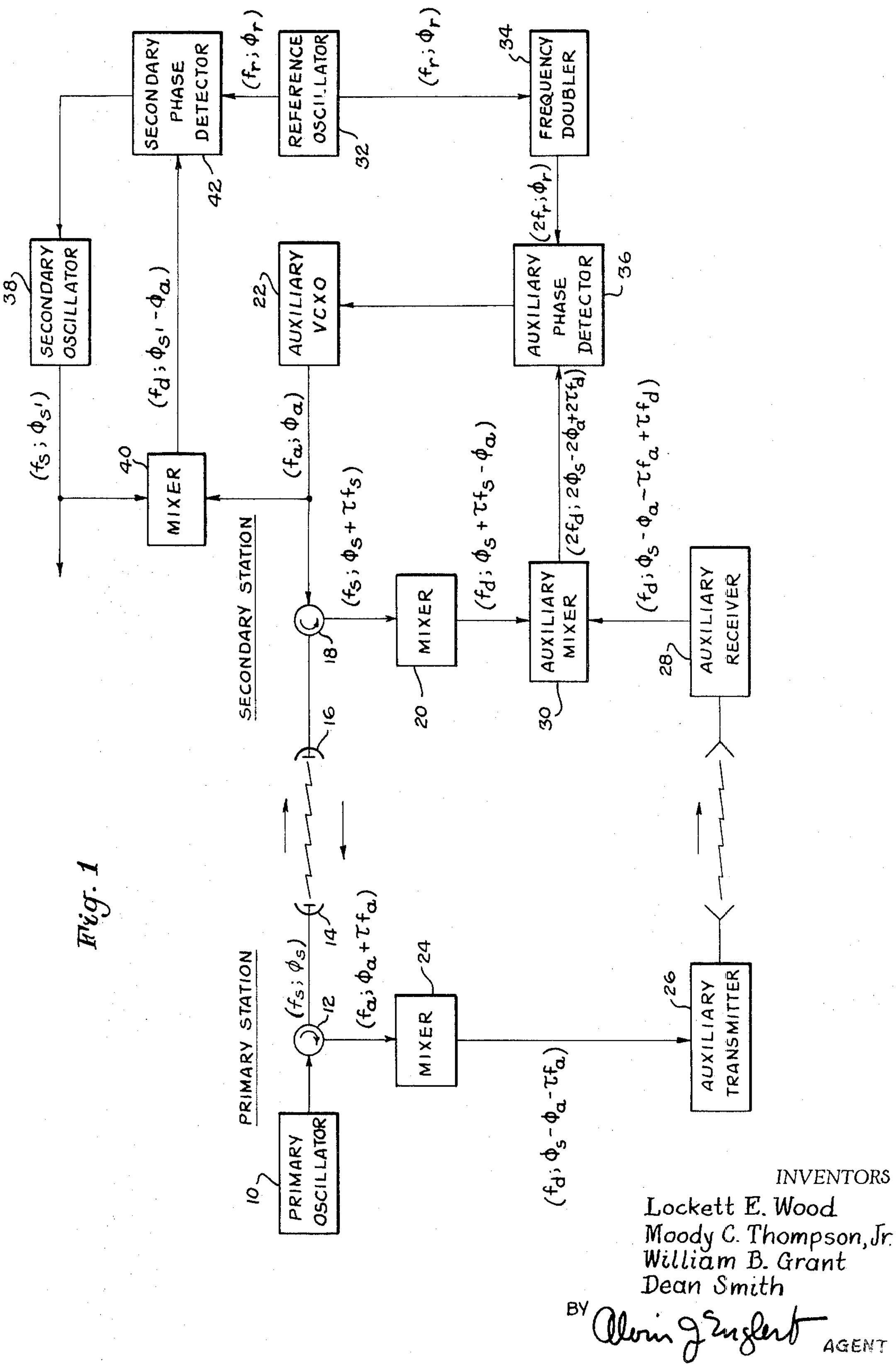
FIG. 1 is a block diagram of an embodiment of the invention.

The system shown in FIG. 1 comprises a primary station and a secondary station that are widely separated, for example, by 10 miles. At the primary station a master or primary signal of frequency $f_s$ and arbitrary reference phase $\Phi_s$ (written $f_s;\Phi_s$) is provided by a stable primary oscillator 10. The signal is routed by a circulator 12 to an antenna 14 and is radiated by the antenna to the distant secondary station.

At the secondary station the incoming signal is $(f_s;\Phi_s+\tau f_s)$, where $\tau$ is the signal transit time over the path from the primary station. This signal is received by an antenna 16 and directed by a circulator 18 to a mixer 20. An auxiliary signal of frequency $f_a$, where $f_a$ is slightly less than the primary signal frequency $f_s$, and arbitrary reference phase $\Phi_a$, is provided by an auxiliary voltage-controlled crystal oscillator (VCXO) 22. Part of this signal $(f_a;\Phi_a)$ is directed by the circulator 18 to mixer 20 and is mixed with the received primary signal to provide a first IF signal $(f_d;\Phi_s+\tau f_s-\Phi_a)$, where $f_d=f_s-f_a$. The rest of the auxiliary signal $(f_a;\Phi_a)$ is radiated by the antenna 16 to the primary station.

At the primary station the incoming signal is $(f_a;\Phi_a+\tau f_a)$. This signal and part of the primary signal $(f_s;\Phi_s)$ are directed by the circulator 12 to a mixer 24 where the signals mix to provide a second IF signal $(f_d;\Phi_s-\Phi_a-\tau f_a)$. This signal is returned to the secondary station via an auxiliary FM transmitter 26 and receiver 28, becoming $(f_d;\Phi_s-\Phi_a-\tau f_a+\tau f_d)$. This signal and the first IF signal are then mixed in an auxiliary mixer 30 to provide a signal at twice the IF frequency with a phase of $$\Phi_s-\Phi_a-\tau f_a+\tau f_d+\Phi_s+\tau f_s-\Phi_a$$
$$=2\Phi_s-2\Phi_a+\tau(f_d+f_s-f_a)=2\Phi_s-2\Phi_a+2\tau f_d \quad (1)$$

since $f_s-f_a=f$ as before.

The secondary station further includes a reference oscillator 32 that provides a signal $(f_r;\Phi_r)$ at the IF frequency. This signal is doubled in a frequency doubler 34, and the resultant signal $(2f_r;2\Phi_r)$ is compared in an auxiliary phase detector 36 with the signal from auxiliary mixer 30. The output from the auxiliary phase detector 36 is used as an error signal to tune the auxiliary VCXO 22. The coop acts to maintain $$2\Phi_s-2\Phi_a+2\tau f_d-2\Phi_r=\text{constant}=2k$$

or $$\Phi_a=\Phi_s+\tau f_d-\Phi_r-k. \quad (2)$$

To transfer the auxiliary signal $(f_a;\Phi_a)$ to the original transmitted frequency $f_s$, a secondary oscillator 38 is arranged to supply a signal $(f_s;\Phi_{s'})$. This signal and the auxiliary signal are mixed in a mixer 40 to provide an IF signal $(f_d;\Phi_{s'}-\Phi_a)$. This IF signal and the reference signal $(f_r;\Phi_r)$ are than compared in a secondary phase detector 42, to provide an error signal that tunes the secondary oscillator 38. The secondary loop acts to maintain $$\Phi_{s'}-\Phi_a-\Phi_r=k' \quad (3)$$

or, substituting (2) into (3), $$\Phi_{s'}-(\Phi_s+\tau f_d-\Phi_r-k)-\Phi_r=k' \quad (4)$$

and $$\Phi_{s'}=\Phi_s+\tau f_d+k'-k. \quad (5)$$

If the IF frequency $f_d$ is kept sufficiently small, the effect of changes in $\tau$ will be negligible and, if the phase-locked loops are sufficiently stable, the last two terms in (5) may be considered constant, giving $$\Phi_{s'}=\Phi_s+k'' \quad (6)$$

Thus the secondary signal is coherent with the primary signal, as desired.

The system in FIG. 1 shows a central station and a single remote station. In many applications there would be several remote stations (not shown), each of which would have a different auxiliary signal frequency $f_a$. Each different $f_a$ would give a different IF when mixed with the primary signal $f_s$ at the primary station, and these various IF's would be multiplexed in the conventional manner on the FM transmitter 26. The FM receiver 28 at each remote station would be equipped with an appropriate filter to select for its auxiliary mixer 30 the desired IF corresponding to its reference oscillator 32. Since multiplex transmission is well known in the art, the construction of such a system could readily be accomplished by those skilled in the art.

Figure 2:
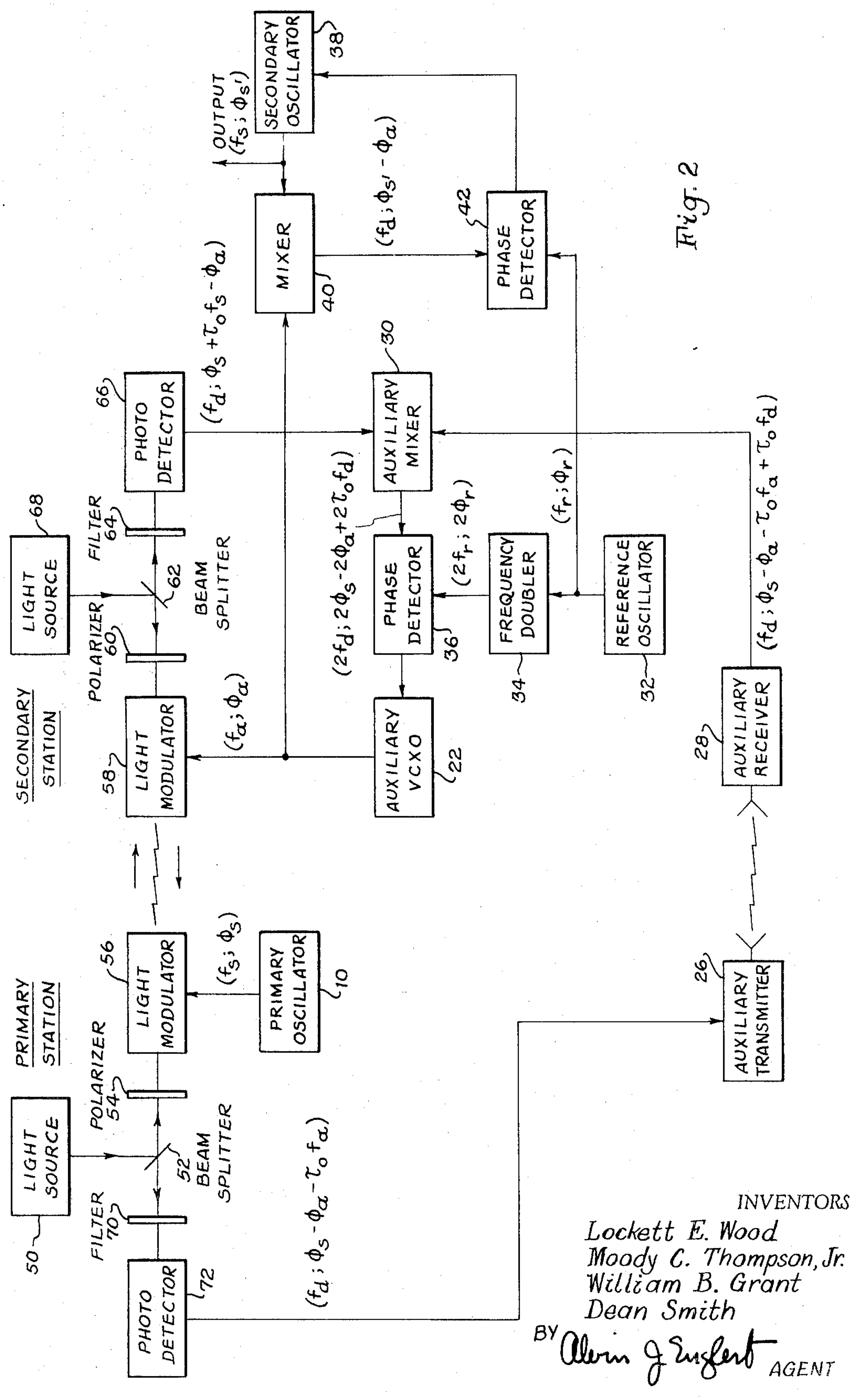
FIG. 2 is a block diagram of another embodiment of the invention utilizing light beams to transmit the primary and auxiliary signals between the stations.

If the wavelength of the primary signal $f_s$ of FIG. 1 is in the centimeter range, the secondary station will receive signal components reflected from the terrain between the station. Under certain meteorological conditions, destructive interference between a strong reflected signal and the direct signal will result in a serious decrease in amplitude of the received signal. In such a situation, it may be desirable to use optical carriers for the primary and auxiliary signals. FIG. 2 illustrates such an embodiment of the invention.

In FIG. 2, a monochromatic light beam from a laser or other light source 50 is partially transmitted and partially reflected by a beam splitter 52, and the reflected portion is plane-polarized by a polarizer 54. The polarized light is polarization modulated in a Kerr cell, Pockel cell, or other light modulator 56 by the primary signal $(f_d;\Phi_s)$ from the primary oscillator 10, and directed over the path from the primary station to the secondary station.

At the secondary station the modulation on the incoming light is $(f_s;\Phi_s+\tau_o f_s)$, where $\tau_o$ is the optical transit time. The incoming light is further modulated by a polarization modulator 58 that is driven by the auxiliary signal $(f_a;\Phi_a)$ from the auxiliary VCXO 22, causing the light to have a polarization modulated component $f_d=f_s-f$. The polarization modulated light is converted by a polarizer 60 to intensity modulated light, which is partially transmitted and partially reflected by a beam splitter 62. The transmitted portion is filtered by a filter 64 to remove light extraneous to the transmitted monochromatic light, and the filtered light is detected by a photodetector 66. The component at $f_d$ is thus converted to the first IF signal $(f_d;\Phi_s+\tau_o f_s-\Phi_a)$.

The secondary station also includes a light source 68 operating at the same wavelength as the source 50. The light beam from the source 68 is partially transitted and partially reflected by the beam splitter 62, and the reflected portion is polarized by the polarizer 60. The plane-polarized light is then polarization modulated in the modulator 58 by the auxiliary signal $(f_a; \Phi_a)$ and directed over the path to the primary station.

At the primary station the modulation on the incoming light is $(f_a; \Phi_a + \tau_o f_a)$. The incoming light is further modulated by the primary signal $(f_s; \Phi_s)$ in the modulator 56, causing the light to have a polarization modulated component at the IF frequency $f_d$. The polarization modulated light is converted to intensity modulated light by the polarizer 54, and the intensity modulated light is partially transmitted and partially reflected by the beam splitter 52. The transmitted portion is filtered by a filter 70 to remove light extraneous to the monochromatic light, and the filtered light is detected by a photodetector 72. The modulation component is thus converted to the second IF signal $(f_d; \Phi_s - \Phi_a - \tau f_a)$. This IF signal is returned to the secondary station by the auxiliary transmitter 26 and auxiliary receiver 28, becoming $(f_d; \Phi_s - \Phi_a - \tau_o f_a + {}_o f_d)$. This signal and the first IF signal are mixed in the auxiliary mixer 30 to give the twice IF frequency signal $(2f_d; 2\Phi_s - 2\Phi_a + 2\tau_o f_d)$, which is derived similar to expression (1) above.

As in the system FIG. 1, the secondary station of FIG. 2 further includes a reference oscillator 32 for providing the reference signal $(f_r; \Phi_r)$; a frequency doubler 34 for doubling the reference signal to $(2f_r; 2\Phi_r)$; and a phase detector 36 for comparing the doubled reference signal and the twice IF frequency signal from mixer 30, to provide an error signal to tune the auxiliary VCXO 22. Thus the loop acts to maintain the phase relationship set forth in expression (2) above. Also as in the system of FIG. 1, the secondary station of FIG. 2 includes a secondary oscillator 38 for providing a secondary signal $(f_s; \Phi_{s'})$; a mixer 40 for mixing the secondary signal and the auxiliary signal $(f_a; \Phi_a)$ to provide another IF signal $(f_d; \Phi_{s'} - \Phi_a)$; and a phase detector 42 for comparing the last IF signal with the IF frequency reference signal $(f_r; \Phi_r)$, so as to provide an error signal for tuning the secondary oscillator 38. This secondary loop therefore acts to maintain the relationships expressed in (3) through (6) above.

Thus the optical carrier system of FIG. 2 provides at a remote secondary station a secondary signal $(f_s; \Phi_{s'})$ that is coherent with a primary signal $(f_s; \Phi_s)$ at a primary station.

We claim:

1. A phase stabilization system comprising:
a primary station;
a secondary station located at a remote distance from said primary station;
said primary station including means for generating a primary signal at a primary frequency, and means for transmitting said primary signal to said secondary station;
said secondary station including means for receiving said primary signal, means for generating an auxiliary signal at a frequency slightly different from said primary frequency, means for mixing said received primary signal with said auxiliary signal to provide a first IF signal, and means for transmitting said auxiliary signal to said primary station;
said primary station further including means for receiving said auxiliary signal, means for mixing said received auxiliary signal with said primary signal to provide a second IF signal, and means for transmitting said second IF signal to said secondary station;
said secondary station further including means for receiving said transmitted second IF signal, means for mixing said received second IF signal with said first IF signal to provide a signal at twice the frequency of said IF signals;
means for generating a reference signal at the frequency of said IF signals;
means for doubling said reference signal;
means for comparing said doubled reference signal with said signal at twice the frequency of said IF signals to provide a first error signal;
means for applying said first error signal to tune said auxiliary signal generating means;
means for generating a secondary signal at said primary frequency;
means for mixing said secondary signal; with said auxiliary signal to provide a third IF signal;
means for comparing said third IF signal with said reference signal to provide a second error signal; and
means for applying said second error signal to said secondary signal generating means to lock said secondary signal to said primary signal.

2. A system as set forth in claim 1, wherein said means for transmitting said primary signal to said secondary station comprises:
means for generating a first monochromatic light beam;
means for plane polarizing a portion of said first monochromatic light beam;
means driven by said primary signal for polarization modulating said polarized first monochromatic light beam; and
means for directing said modulated first monochromatic light beam to said secondary station.

3. A system as set forth in claim 2, wherein said means for mixing said recieved primary signal with said auxiliary signal to provide said first IF signal comprises:
means driven by said auxiliary signal for polarization modulating said modulated first monochromatic light beam to provide a component at said IF frequency;
means for converting said polarization modulated first monochromatic light beam to intensity modulated light; and
means for detecting the component of intensity modulation at said IF frequency.

4. A system as set forth in claim 3, wherein said means for transmitting said auxiliary signal to said primary station comprises:
means for generating a second monochromatic light beam; and
means for directing a portion of said second monochromatic light beam through said polarization converting means and said polarization modulating means driven by said auxiliary signal, and to said primary station.

5. A system as set forth in claim 4, wherein said means for mixing said received auxiliary signal with said primary signal to provide said second IF signal comprises:
means for directing said polarization modulated second monochromatic light beam through said polarization modulating means driven by said primary signal, to provide a component at said IF frequency, and through said plane polarizing means to convert said polarization modulated light to intensity modulated light; and
means for detecting the component of intensity modulated light at said IF frequency.